United States Patent [19]

Htsui

[11] 3,858,098
[45] Dec. 31, 1974

[54] DYNAMOELECTRIC CONTROL SYSTEM AND MOTOR THEREFOR

[75] Inventor: John S. C. Htsui, Hazelwood, Mo.

[73] Assignee: Emerson Electric Co., St. Louis County, Mo.

[22] Filed: Sept. 7, 1973

[21] Appl. No.: 395,187

[52] U.S. Cl. .............................. 318/138, 310/268
[51] Int. Cl. ........................................ H02k 29/00
[58] Field of Search .................... 318/138; 310/268

[56] References Cited
UNITED STATES PATENTS

| | | | |
|---|---|---|---|
| 3,508,130 | 4/1970 | Van Buskirk | 318/138 |
| 3,701,042 | 10/1972 | Dukes | 318/138 X |
| 3,769,555 | 10/1973 | Dolbachian et al. | 318/138 |
| 3,784,888 | 1/1974 | Geiersbach et al. | 318/138 |
| 3,796,039 | 3/1974 | Lucien | 310/268 X |

Primary Examiner—Robert K. Schaefer
Assistant Examiner—W. E. Duncanson, Jr.
Attorney, Agent, or Firm—Polster and Polster

[57] ABSTRACT

A method and system for providing an electronically controlled motor that controls armature movement by adjusting the polarity of the field assembly circuit. The armature may be a disc type and is designed to carry a unidirectional DC current. Input and output of the DC armature current is accomplished by utilizing continuous slip rings to feed the unidirectional DC current through the armature. The motor operates without conventional commutation, and sparking is eliminated. Means are provided for sensing armature position and generating an output signal based on that position, the output signal is utilized to control power input to the field assembly circuit.

11 Claims, 5 Drawing Figures

DYNAMOELECTRIC CONTROL SYSTEM AND MOTOR THEREFOR

BACKGROUND OF THE INVENTION

This invention relates to dynamoelectric machines and in particular to a novel motor system which develops high torque, instantaneous rotation reversal and simple speed control.

The operation of a conventional DC motor depends on the principle that a current carrying conductor placed in, and at angles to, a magnetic field tends to move at right angles to the direction of the field. Motors conventionally have a stator or field assembly and a rotor or armature assembly. The armature is mounted to a motor shaft and the shaft is rotatably supported by the motor enclosure along suitable journal bearings. The field assembly carries the field coils, generally wound about the field poles. The field assembly also conventionally has an axial opening through it. The armature is carried in the axial opening. The armature includes a plurality of current carrying conductors or wire turns assembled in it and the conductor ends are electrically connected to a commutator, which is attached to the armature and rotates with it. The commutator conventionally is a split ring device. Power input to the armature is accomplished by brushes which make electrical contact with the commutator. The wire turns of the armature are divided into a number of poles, corresponding to the number of poles in the field assembly. The number of brushes in a DC machine may vary. For a device utilizing a lap winding, it is conventional to use a number of brushes equal to the number of poles. Each brush is located in a neutral plane between each parallel pole. The positive brushes are connected together to form the positive output, and the negative brushes are connected together to form the negative output. Reversing the polarity of the voltage applied either to the armature or the field will reverse the rotational direction for a DC motor. By reversing armature current as the armature rotates in the field of the conventional DC motor, armature rotation continues in a prescribed direction. The process of reversing current flow in the armature is known as commutation and a considerable body of art has developed around commutator construction and placement.

In approximately 1950, a new construction form for DC motors was developed generally known in the art as disc or printed circuit motors. The printed circuit motor, as exemplified in the U.S. Pat. No. 3,144,574 to Henry-Baudot, issued Aug. 11, 1964, although utilizing a new method of armature construction, retained the principles of operation of the more conventional DC apparatus described above, in that commutation, that is, changing the polarity of the voltage of the armature at the dead zone between poles, continued to be accomplished in the old manner. When these techniques are used, the disc rotor type machine is not able to develop high torque, comparable, for example, to conventional third or half horse power D.C. motors. Printed circuit motors generally have had rather limited application in low torque environments where intermittant motion is required, such as in tape paper readers, for example. They also are used as positioning servo motors where the lack of any preferred armature position and smoothness of torque are an advantage. They also have been used as velocity servos and because of their flat shape, low cost versions of them are used to open and close windows in automobile doors.

In the apparatus and control system described hereinafter, a disc type armature is provided with a constant, unidirectional current. Control of the armature is obtained by switching the polarity of the field coils at proper times in order to reverse motor direction quickly or to provide a continuously running motor running in a single direction. The preferred armature assembly is a disc type, and an extremely low profile motor is provided. Since the rotor current is unidirectional, conventional commutation, or polarity change of the armature current is eliminated, and the armature is able to carry high, single direction current loads. Consequently, high starting torque per ampere can be achieved. The high armature currents, being unidirectional, do not cause sparking and the related low brush life inherent with sparking found in more conventional DC machines. Reliable motor reversal is obtained simply by changing the field pole polarity. Speed control is obtained merely by adjusting the frequency with which field pole polarity is changed.

Because of the high torques available with the motor described hereinafter, applications for disc type armature of printed circuit construction, can be expanded greatly. Thus, for example, the system described hereinafter may find application in a conventional washing machine where cyclic reversal of the field polarity and corresponding armature reversal is equatable to an agitation or washing mode and the continuous run condition of the motor corresponds to the spin dry cycle of the appliance. The motor may be connected mechanically to drive the wash basket directly, eliminating the need for transmissions now commonly found in washing machine applications. Those skilled in the art also will appreciate that practical infinite speed control, within a particular motor's capability becomes possible simply by varying the frequency with which the field pole polarities are changed.

One of the objects of this invention is to provide an improved motor control system.

Another object of this invention is to provide a new and unique method for controlling motor operation.

Yet another object of this invention is to provide a printed circuit motor having high starting torque characteristics.

Yet another object of this invention is to provide a motor capable of instantaneous reversal.

Another object of this invention is to provide a motor system for permitting infinite speed control of a dynamoelectric machine.

Still another object of this invention is to provide a DC machine having a unidirectional armature current.

Other objects of this invention will be apparent to those skilled in the art in light of the following description and accompanying drawings.

SUMMARY OF THE INVENTION

In accordance with this invention, generally stated, a dynamoelectric machine is provided having an armature assembly and a field assembly. The armature assembly includes an armature or rotor mounted for rotation with respect to the field assembly. The rotor has means for electrically applying a unidirectional electrical current operatively connected to it.

In the preferred embodiment, the rotor is a disc type device having a continuous electric winding symmetrically arranged on it. A slip ring is connected to each end of the winding. One slip ring forms an input and a second slip ring forms the output for the unidirectional armature current. Means are provided for changing the polarity of the field poles in accordance with rotor position when single direction armature rotation is desired. When the polarity of the field poles is not changed, automatic armature reversal occurs.

DESCRIPTION OF THE PREFERRED EMBODIMENT

Figure 1:
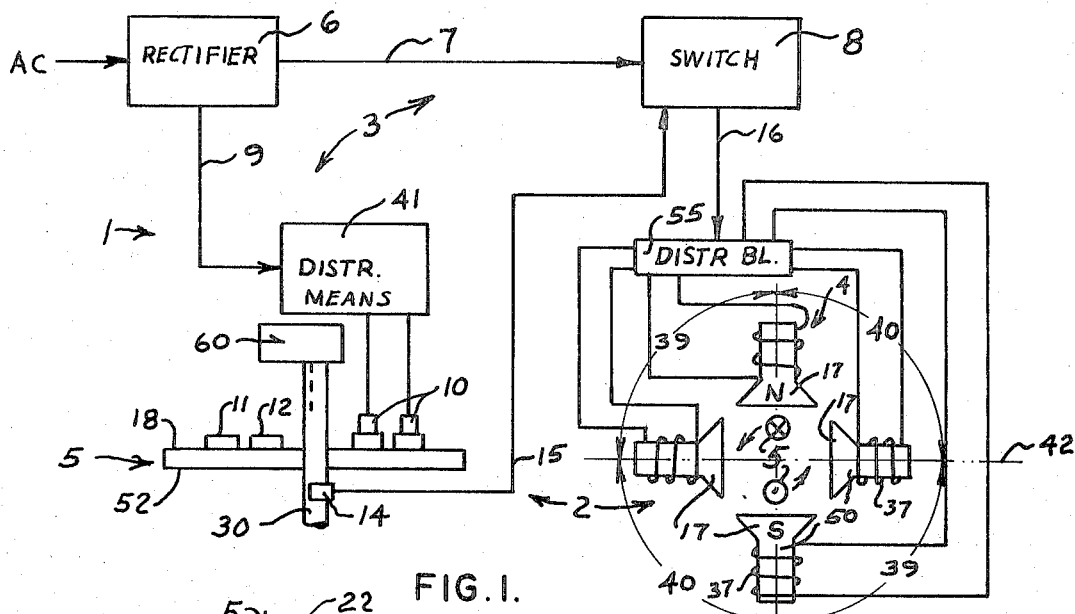
FIG. 1 is a block schematic diagram for the method and apparatus of motor system of this invention.

Referring now to FIG. 1, reference numeral 1 indicates the motor system of this invention. Motor system 1 includes a motor 2 and control circuitry 3. The motor 2 comprises a field assembly 4 and an armature assembly 5. In the preferred embodiment, the field assembly 4 is illustratively shown as a four pole device. Those skilled in the art will recognize, however, that the number of field poles may vary in other embodiments of this invention.

The control circuitry 3 is designed to vary the polarity of the field poles, a procedure later described in detail. Control circuitry 3 includes a rectifier 6 connected across the power input from an AC power source, not shown. Rectifier 6 may be any conventional arrangement for obtaining full wave DC rectification from an AC source. Where DC power is available initially, rectifier 6 may be eliminated. The output of rectifier 6 is fed, via a conductor 7, to an electronic switch means 8. The DC output also forms an input, via a conductor 9 to a pair of brushes 10. A distribution means 41 may be provided between the brushes 10 and the rectifier 6. The distribution means 41 need be no more than a terminal board and associated electrical connections. The brushes 10, each of opposite polarity, are connected electrically to individual ones of a pair of annular rings, 11 and 12 respectively. The rings 11 and 12 are carried by the armature 5 and are described in detail hereinafter.

The armature 5 is mounted to a shaft 30 by any conventional method. For example, the shaft 30 may be press fit to the armature 5. Other mounting methods work well. The shaft 30 has a position sensor 14 operatively associated with it. The function of the position sensor 14 is to generate a gate control signal output, along a conductor 15, which is utilized to control the operation of the electronic switch means 8.

Electronic switch means 8 regulates the DC power input from the rectifier 6 to the field assembly 4. Output of the switch means 8 appears along a conductor 16. It will be understood by those skilled in the art, that in certain instances, individual conductors shown in the drawings, and in particular FIG. 1, in actuality may be plural electrical conductors which, for drawings simplicity and ease of description are shown in singular form. Conductor 16 is electrically connected to the field assembly 4. This connection is illustratively shown by a distribution block labelled in FIG. 1 and assigned the numeral 55. Again, those skilled in the art will recognize that distribution may be accomplished by mere electrical connections with the electronic switch means 8 and that the distribution block 55 merely facilitates and graphically demonstrates the unique motor and motor operation disclosed herein.

Field assembly 4 is conventional in that it includes a plurality of pole pieces 17 symmetrically arranged with respect to the armature 5. Each of the pole pieces 17 has a laminated core of magnetic material 50 having a field coil winding 37 disposed about it.

Figure 2:
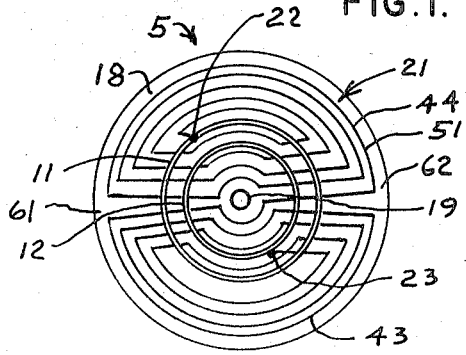
FIG. 2 is a diagrammatic representation of a printed circuit rotor construction utilized in the motor system of FIG. 1.
Figure 4:
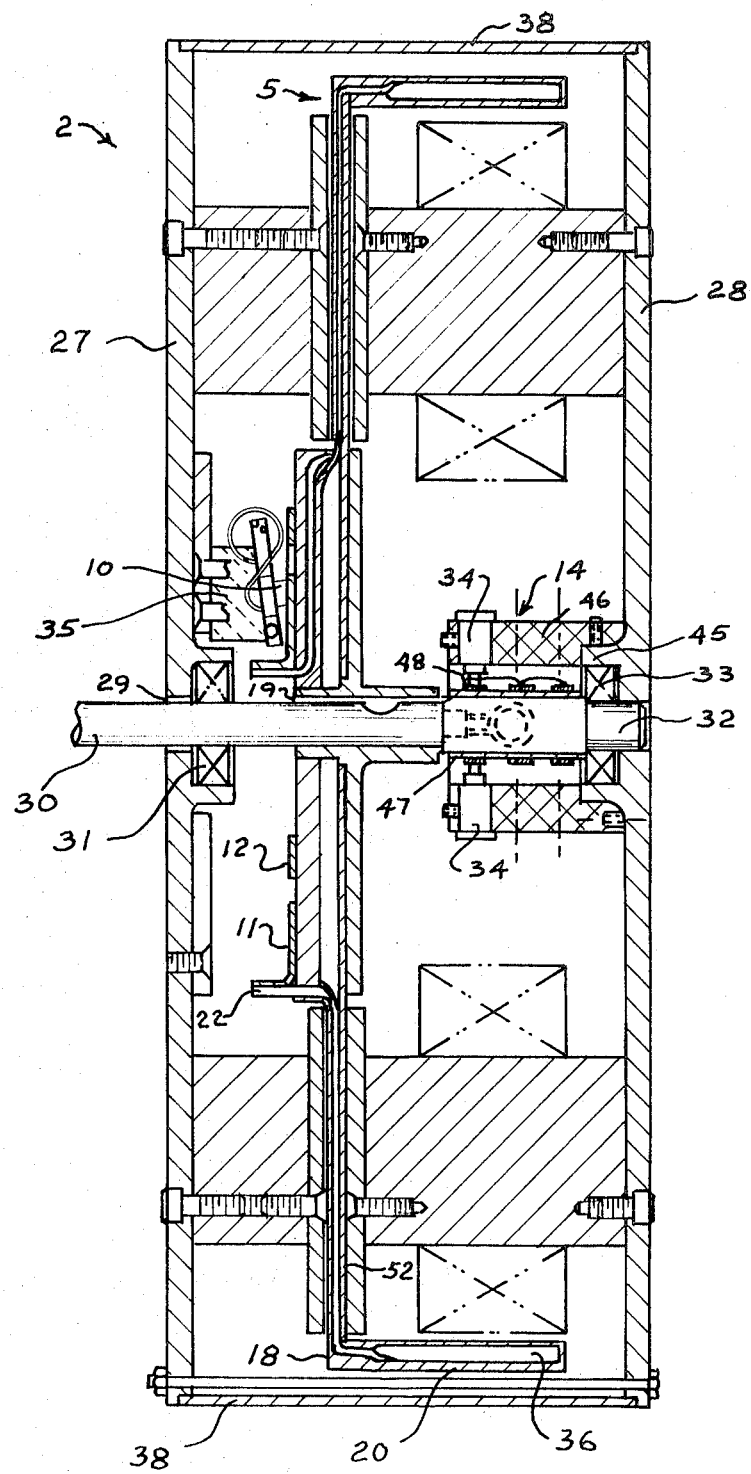
FIG. 4 is a sectional view of a motor constructed in accordance with the principles of this invention.

It may be observed, in FIG. 2, that the armature 5 is represented by a disc construction having a single current carrying conductor 51 disposed on it, forming a winding 21. The armature 5 has an upper surface 18 and a lower surface 52. The armature has a central axial opening 19 in it, from and through the surfaces 18 and 52. The embodiment illustrated also has a skirt 20 extending perpendicularly from the surface 52, as is best seen in FIG. 4. As indicated above, the surface 18 has the winding 21 disposed on it. The winding 21 has a start 22 and a finish 23 and is symmetrically arranged about the surface 18, on opposite halves of that surface. The paticular winding 21 illustrated is a two pole winding. The ring 11 is electrically connected to the start 22 while the ring 12 is electrically connected to the finish 23. It will be understood by those skilled in the art that the armature 5 may have any number of poles, the exact number being determined by design consideration not herein involved, and the number of poles may vary with other embodiments of this invention. It is a feature of the armature of the motor of this invention that the winding 21 may be placed on a single side of the armature 5, and no cross connections through the armature 5, between the surface 18 and surface 52, are required. While such construction is preferred, of course, the more conventional wave and lap windings illustrated in the above referenced Henry-Baudot U.S. Pat. No. 3,144,574, for example, are compatible with the broader aspects of this invention.

It has been noted that the armature assembly 5 shown in FIG. 2 is a two pole device. The field assembly 4 likewise is a two pole device, although it utilizes four of the pole pieces 17. This is in contradistinction to prior art D.C. machines which conventionally are designed so that the number of electrical poles and the number of pole pieces are equal. The motor of this invention is designed so that field assembly 4 has twice as many pole pieces 17 as the number of electrical poles.

It may be observed in FIG. 4, that the motor 2 includes a first end shield 27, a second end shield 28 and a motor shell 38. End shields 27 and 28 are substantially circular members. The end shield 27 has a central opening 29 through it which permits passage of the shaft 30. The shaft 30 is mounted for rotation with respect to the end shield 27 by a suitable bearing assembly 31.

An end 32 of the shaft 30 is rotatably supported by a bearing assembly 33 along a hub 45 of the end shield 28. The hub 45 preferably is integrally formed with the end shield 28. However, the hub 45 may be manufactured separately and later attached to the end shield 28. The hub 45-end shield 28 function and structure are conventional.

The position sensor 14 is placed along the end 32 of the shaft 30, although other placement locations for the position sensor 14 are acceptable. Position sensor 14 can be constructed from a set of signal rings and brushes or with a brushless device, such as a photocell device, a Hall-effect magnetic sensor or a radio frequency coupler. The embodiment shown in FIG. 4 uses a plurality of brushes 34, only a pair of which are shown for drawing simplicity, for developing the output signal to the electronic switch means 8. The brushes 34 are mounted in a brush holder 46. Brush holder 46, in turn, is attached to the hub 45-end shield 28 combination by any convenient method. Conventional threaded fasteners work well. A sleeve 47 is mounted to the end 32 of the shaft 30 and rotates with the shaft 30. The sleeve 47 has a plurality of copper rings 48 attached to it. The embodiment illustrated uses three rings 48 and four brushes 34 for determining armature position and developing the output signal based on that position.

The armature 5 is mounted to the shaft 30 and rotates with it. The rings 11 and 12 are attached to the armature assembly 5 and are electrically connected to respective ones of the start 22 and the finish 23 of the winding 21. Each of the rings 11 and 12, as their name implies, are relatively flat, continuous annular parts constructed from suitable electrically conductive material. A pair of brush assembly 35, which include the brushes 10, supply the unidirectional current to the armature assembly 5. One of the brush assemblies 35 is operatively connected to one of the rings 11 and 12. The brush assemblies 35 are conventional and are not described in detail.

As indicated above, printed circuit techniques may be utilized to construct the winding 21 along the surface 18 of the armature assembly 5. The particular embodiment illustrated in FIG. 4, however, utilizes a continuous turn of wire 36 rather than actual printed circuit techniques for the winding 21. The wire turn 36 extends downwardly along the skirt 20 on one side of the armature assembly 5, along the perimeter of the armature 5 as defined by the skirt 20, and upwardly along the skirt 20 on an opposite side of the surface 18. That is, the wire turn 36 extends across the surface 18 in a laterally displaced relationship with successive loops of the wire turns 36. Then, each loop of the turn 36 is in a vertically spaced, stacked parallelwise relationship along the skirt 20 as the wire turn 36 moves from a side 61 of the surface 18 to a side 62 of the surface 18 in the formation of a pole 44 for the armature assembly 5. A pole 43 is formed in like manner and is not described in detail. As indicated, skirt 20 provides a pathway for wire turn 36 travel. Since the skirt 20 extends perpendicularly from the surface 18, the diameter of the armature is reduced from other possible embodiments, as for example, where the wire turn is made completely along a flat disc. In addition, the resulting cross sectional L-shape of the armature perimeter increases the strength and rigidity of the armature assembly.

Field assembly 4 includes the pole pieces 17 which have the field coil windings 37 disposed about them. The position and operation of the field coil windings 37 and the pole pieces 17 are conventional and are not described in detail.

Motor shell 38 generally is a cylindrical, tubular structure joined at its end to the end shields 27 and 28. The various components of the motor 2 may be interconnected by conventional fastening means and threaded fasteners are used where applicable in the embodiment illustrated.

In operation, rectifier 6 supplies DC input to the electronic switch 8. Electronic switch 8, in turn, controls application of current and voltage to the field coils 37. With the polarity illustrated in FIG. 1, the motor 2 will have an acceleration zone 39, a decelerator zone 40 and a neutral position indicated by an axis 42. The neutral position, acceleration and deceleration zones, of course, can be adjusted with relation to the pole pieces 17 by changing the polarity of the pole pieces.

The polarity of FIG. 1 results in the development of a counter clockwise torque on the armature 5. For illustrative purposes, the armature 5 is shown in both FIGS. 1 and 3 as a continuous conductor loop device having a unidirectional current flowing through it. The torque direction remains the same while the conductors comprising the armature 5 are in the acceleration zone 39 of the motor 2. When the conductors enter the deceleration zone 40, the force developed on the armature 5 is reversed. As will be understood by those skilled in the art, the magnitude of the torque is smallest when the conductors are close to the neutral position 42. Theoretically, there is no torque developed when the conductors are in the neutral position 42. In other words, the armature 5 would come to rest at the neutral position 42 after an initial movement in the acceleration zone 39 and a retarding movement in the deceleration zone 40. That situation is represented by the armature position shown in FIG. 3.

Figure 3:
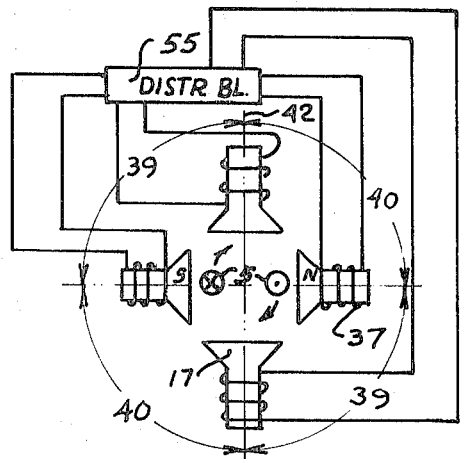
FIG. 3 is a diagrammatic representation illustrating a first operation sequence for the motor system shown in FIG. 1.

Thereafter, if the polarities of the pole pieces are changed to that illustrated in FIG. 3, a clockwise torque is developed on the armature 5 and the armature again will pass through the acceleration zone 39 and the deceleration zone 40, again coming to rest at the neutral position 42. It thus may be seen that excitation of the field poles cyclicly between the polarities shown in FIGS. 1 and 3 causes the armature 5 to cycle between alternate positions. Consequently, the motor 2 accomplishes automatically a physical armature movement directly comparable to the agitation motion of a conventional washing machine. It follows that mechanical connection between the shaft 30 of the motor 2 and an appliance, such as a washing machine, for example, indicated generally by the reference numeral 60 produces an agitation motion without the need for the transmission devices presently used in such appliance applications. Those skilled in the art will recognize that all four of the pole pieces 17 illustrated in FIGS. 1 and 3 may be energized at the same time, with the same cyclic reversal resulting.

Figure 5:
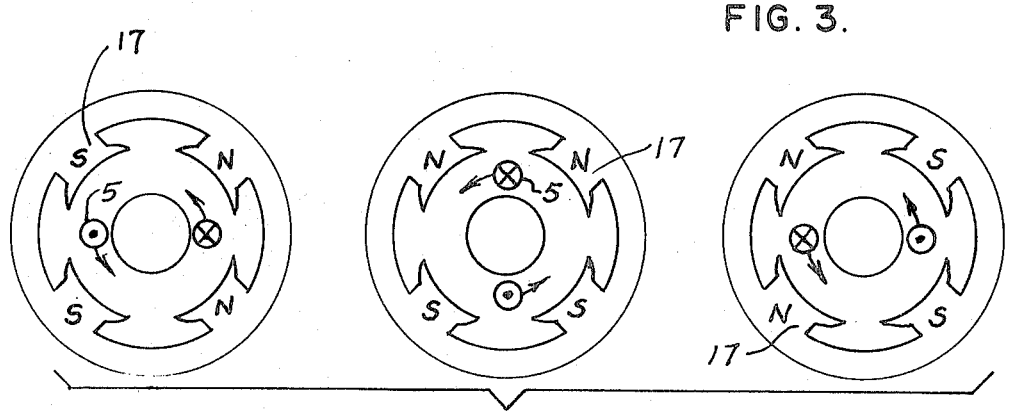
FIG. 5 is a diagrammatic representation illustrating a second operation sequence for the motor system shown in FIG. 1.

FIG. 5 diagrammatically illustrates how the pole piece 17 polarity is adjusted so that a unidirectional torque is developed. In FIG. 5, the pole piece polarity is advanced simultaneously with armature movement in order to maintain armature 5 rotation in a single direction. It is apparent that speed of the armature 5 in either a clockwise or counter clockwise direction can be controlled by permitting the armature 5 to advance into the deceleration zone 40 for some predetermined amount before adjusting the polarity of the pole pieces 17 to permit continued rotation in a preselected direction. In this manner, large range speed control is accomplished without the problems inherent in prior art devices. Likewise, the automatic cyclic reversal speed described above easily can be controlled by controlling frequency with which the pole piece polarity is reversed.

As indicated above, armature position is sensed by position sensing means 14 and the output of the sensor 10 is utilized to control electronic switch means 8. Electronic switch means 8 may comprise a variety of conventional devices. Although those skilled in the art will be able to construct circuitry for the functions described hereinabove, additional background information and circuits for such purpose may be found in *SCR MANUAL*, (5th edition) Semiconductor Products Department, General Electric Company, Syracuse, N.Y.; *Transistor Manual*, (7th edition), Semiconductor Products Department, General Electric Company, Syracuse, N.Y.; and *Semiconductor Power Circuits Handbook*, (1st edition), Motorola Semiconductor Products Division, Phoenix, Ariz.

Numerous variations, within the scope of the appended claims, will occur to those skilled in the art in light of the foregoing description and accompanying drawings. Thus the end shields and shell assembly enclosing the field and armature assemblies may be changed. Likewise, although a two pole device was shown and described, the number of poles may be varied in other embodiments of this invention. Although various speeds can be obtained with any number of poles, it generally is advantageous to pattern the number of poles of the motor 2 in accordance with more conventional design theory for the no load speed of DC machines. These variations are merely illustrative.

Having thus described the invention, what is claimed and desired to be secured by Letters Patent is:

1. A disc armature assembly for a dynamoelectric machine comprising:
   a disc shaped armature surface, said armature surface having a central opening in it;
   a continuous winding formed on said armature surface;
   a shaft mounted on said armature surface through said opening; and
   a skirt extending outwardly from said armature surface, parallel to said shaft, said armature surface and said skirt being L-shaped in cross section.

2. A motor comprising:
   a disc armature assembly having a winding defining a frist number of electrical poles, said disc armature further comprising a disc armature surface, said armature surface having a central opening in it, a continuous winding formed on said surface, a shaft mounted to said armature surface through said opening, and a skirt extending outwardly from said armature surface, parallel to said shaft, said armature surface and said skirt being L-shaped in cross section; and
   a field assembly adapted to drive said armature assembly, said field assembly having a second number of pole pieces, said second number of pole pieces being twice the number of said first number of electrical poles.

3. The motor of claim 2 wherein said armature assembly includes a rotating member, further characterized by a control circuit having an input side and an output side, the output side of said control circuit being electrically connected to said field assembly, and means for sensing and developing an electrical signal indicating the position of said armature assembly rotating member, said last mentioned means being electrically connected to the input side of said control circuit.

4. In a device having a structural member driven in at least two operational modes, one of said modes being continuous cyclic reversal occurring at intervals of less than 360° of travel of said member, and the other of said modes being continuous rotation of said member in a preselected direction for a preselected period of time, the improvement which comprises dynamoelectric system means for directly driving said member in said operational modes, said system means comprising a motor adapted to be driven from a source of DC power, said motor including an armature circuit assembly including a shaft rotatably supported for movement and an armature mounted to said shaft, said shaft being operatively connected to said structural member, said armature having a winding defining a first number of electrical poles, a field assembly adapted to drive said armature, said field assembly having a second number of pole pieces, said second number of pole pieces being twice the total number of said first number of electrical poles, means for applying a unidirectional DC current to the winding of said armature, means for generating an output electrical signal based on armature position, and control means for controlling the power input to said field assembly responsive to said output electrical signal from said generating means.

5. In a device having a member driven in at least two operational modes, one of said modes being a continuous cyclic reversal movement occuring at intervals less than 360° of rotational movement of said member, and the other of said modes being continuous rotation of said member in a preselected direction, the improvement which comprises dynamoelectric system means for driving said member in each of said operational modes, said dynamoelectric system means comprising a motor, said motor including an armature assembly and a field assembly, said armature assembly comprising an armature including a winding; means for applying a unidirectional current to said winding; control means for controlling the power input to said field assembly; and signal generating means for sensing armature position operatively connected between said motor and said control means.

6. The improvement of claim 5 wherein said armature assembly of said motor is directly connected to said member to drive said member in said two operational modes.

7. The improvement of claim 5 wherein said armature assembly is further characterized by a disc armature surface, said armature surface having a central opening in it, said winding being formed on said armature surface, a shaft mounted to said armature surface through said opening, and a skirt extending outwardly from said armature surface, parallel to said shaft, said armature surface and said skirt having an L-shape in cross section.

8. A motor system including a motor having a DC power source, comprising:
   an armature circuit assembly including a rotating member rotatably supported for movement, said armature circuit assembly including a printed circuit armature, said armature having a top surface, a symmetrically arranged winding printed on said top surface, said top surface having an axial opening in it, and a skirt extending from said top surface, parallel to the axis of said axial opening;

means for supplying said DC power source to said armature circuit assembly to establish a continuous, unidirectional current in said armature circuit assembly;

means for sensing and developing an electrical signal indicating the position of said rotating member of said armature circuit assembly;

a control circuit having said DC power source and said rotating member position signal as inputs; and a field assembly including a plurality of field windings electrically connected to said control circuit and selectively energizable by said control circuit to control movement of said rotating member.

9. A motor system including a motor having a DC power source, comprising:

rectifier means for providing said DC power source from an AC supply;

an armature circuit assembly including a rotating member rotatably supported for movement, said armature circuit assembly being further characterized by a shaft having said rotating member mounted on it, and an armature having a first surface, a pair of electrically conductive rings mounted to said armature along said first surface, and a continuous winding having a first end and a second end, one each of said rings being electrically connected to individual ones of said first and said second ends of said winding;

means for applying said DC power source to said armature circuit assembly to establish a continuous, unidirectional current in said armature circuit assembly;

means for sensing and developing an electrical signal indicating the position of said rotating member of said armature circuit assembly, said sensing means being mounted on said shaft;

a control circuit having said DC power source and said rotating member position signal as inputs; and a field circuit assembly including a plurality of field windings electrically connected to said control circuit and selectively energizable by said control circuit to control movement of said rotating member.

10. A method for controlling the operation of an electrical motor having an armature circuit including a rotating armature member and a field circuit, comprising the steps of:

applying a constant DC voltage and current to the armature circuit of said motor;

applying a DC voltage to an electronic control circuit to obtain a control signal output for controlling the field circuit of said motor;

sensing armature position to develop a signal input to said electronic control circuit means; and applying a control signal output from said electronic control circuit to said field circuit in accordance with said armature position to drive said armature, said control signal output applying step being further characterized by providing at least two modes of operation for said motor by the application of said control signal output, one of said modes of operation being a continuous cyclic reversal, rotational movement of said armature, and the other of said modes of operation being a continuous rotation of said armature in a preselected direction.

11. The method of claim 10 including the initial step of rectifying an AC voltage to attain a constant DC voltage and current.

* * * * *